April 2, 1968 E. C. JAMES 3,376,423
LIGHT RESPONSIVE CIRCUIT WHICH PREVENTS PHOTOSENSITIVE DEVICE SATURATION
Filed March 15, 1965
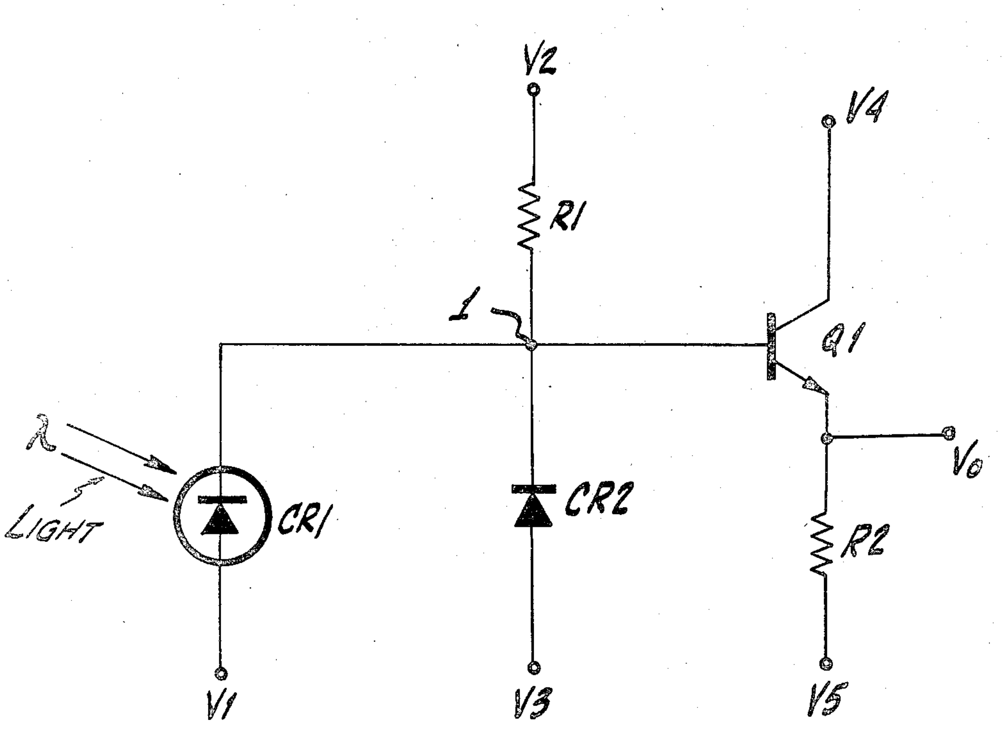
INVENTOR.
EMRYS CRAIG JAMES
BY John V. Regan
Attorney United States Patent Office 3,376,423
Patented Apr. 2, 1968

3,376,423

LIGHT RESPONSIVE CIRCUIT WHICH PREVENTS PHOTOSENSITIVE DEVICE SATURATION

Emrys C. James, Lake Park, Fla., assignor to Radio Corporation of America, a corporation of Delaware Filed Mar. 15, 1965, Ser. No. 439,722
7 Claims. (Cl. 250—206)

This invention relates to electronic circuitry and more particularly to light sensitive circuitry for converting to digital form the useful output signal derived from a photosensitive device.

Photosensitive devices are used in digital computers, for example, as transducers for reading or sensing information, appearing as perforations in solid media such as punched tape, punched cards, timing discs and the like. These devices also are used as sensing elements in automatic document reader systems wherein information appearing as human language characters and/or their coded equivalents are printed or otherwise recorded in visible form on a recording medium. It generally is desired that the output signals provided by the output circuitry be digital in form, having a first level or amplitude when information is present and sensed and having a second different level or amplitude when no information is sensed. However, the intensity of the light supplied to a photosensitive device may vary from one item of information to another due to variations in print density, size of perforations and other factors. In addition, the light sensitive circuitry is often required to respond to very rapid changes from a light to a dark and back to a light condition.

Prior art techniques guarantee only that the light sensitive circuit react properly to a minimum value of light current when sensing a light condition and that the circuit react properly to a maximum dark current when sensing a dark condition. These prior art techniques do not prevent the voltage drop across the photosensitive devices from approaching zero with the result that the devices often saturate due to variations of light intensity. The saturation of a semiconductive photosensitive device is undesirable in that there is a substantial amount of time required before the photosensitive device can react properly to a dark condition. Consequently, a photosensitive device and the light sensitive circuitry may not properly respond to a dark condition when there is a very rapid change from a light to a dark and back to a light condition.

It is an object of this invention to prevent a photosensitive device from saturating when sensing a light condition.

In accordance with this invention, there is provided a light sensitive circuit having a light sensitive semiconductor which has first and second electrodes. Means are provided for coupling first and second reference potentials to the first and second electrodes, respectively, where the first reference potential is more positive than the second. A saturation preventing diode is coupled between a third reference potential and either the first or second electrodes of the light responsive semiconductor. The saturation preventing diode clamps either the first or the second electrode of the light responsive semiconductor to a potential intermediate the first and second reference potentials when the semiconductor responds to a predetermined light intensity.

Referring now to the drawing, a light responsive semiconductor CR1 has a first electrode coupled to the cathode of a diode CR2 at circuit junction 1. A source of reference potential V2 is coupled by way of a resistor R1 to circuit junction 1. Potential sources V1 and V3 are connected to the second electrode of the semiconductor CR1 and to the anode of diode CR2 respectively.

The light sensitive circuit also includes a transistor Q1 having its base connected to the circuit junction 1, its collector connected to a reference potential V4 and its emitter coupled to a reference potential V5 by way of resistor R2. An output connection $V_0$ is connected to the emitter of transistor Q1.

Assume that potential V2 is more positive than and much larger in magnitude than potential V1. Assume also that potential V3 is more positive than potential V1 and less positive than potential V2, that V4 is more positive than V3 and less positive than V2, and that V5 is more negative than V3.

The light sensitive circuit is required to produce first and second voltage levels in response to dark and light conditions sensed by the photosensitive device such as a photodiode CR1. In the dark condition when no light is incident on photosensor CR1, its impedance is very large so that the voltage at circuit junction 1 is much larger than and more positive than either potential V1 or V3. Consequently, diode CR2 is reverse biased into a high impedance condition. In the dark condition photosensor CR1 conducts a very small current, sometimes called a dark current, in the series circuit of potential V2, resistance R1, photodiode CR1 and potential V1. However, this dark current is very small, and a substantially larger current flows in the series circuit of potential V2, resistance R1 and the base of transistor Q1. Potentials V2, V4 and V5 are selected so that transistor Q1 is saturated or nearly saturated by the bias current applied to its base during the dark condition. The output $V_0$ is approximately the value of potential V4 for this condition.

As light becomes incident upon photodiode CR1, the current therethrough increases; while the current applied to the base of transistor Q1 decreases. The light sensitive circuit is designed so that transistor Q1 tends to cut off when photodiode CR1 conducts a certain amount of current, corresponding to a certain light intensity. When transistor Q1 reaches a low conductance state, the output changes from the voltage level of potential V4 to approximately the voltage level V3 (modified by the voltage drops of diode CR2 and the base-emitter junction of transistor Q1) for this condition.

The light intensity to which the circuit is responsive is predetermined as a minimum light intensity. This predetermined light intensity is chosen so that the light responsive semiconductor CR1 operates in an unsaturated condition. Since the predetermined light intensity is minimum, the light intensity is often great enough to saturate the photodiode CR1; that is, the voltage across photodiode CR1 approaches zero as the light intensity increases. The saturation of photodiode CR1 is undesirable because a substantial amount of time is required before it can properly respond to a dark condition.

In order to prevent the undesirable saturation condition of the photosensor, the value of reference potential V3 is selected to be more positive than reference potential V1 by such amount that diode CR2 becomes forward biased when photodiode CR1 conducts a current which is equal to or slightly greater than the minimum current corresponding to the predetermined light intensity. As the current through photodiode CR1 increases with increasing light intensity, the voltage at circuit junction 1 decreases until it is more negative than potential V3 so that diode CR2 becomes forward biased into a low impedance condition, clamping the cathode of photodiode CR1 to a voltage differing from potential V3 by the voltage drop across diode CR2. The first electrode of photodiode CR1 is maintained at this clamped voltage even though the light intensity incident upon and the current through photodiode CR1 may further increase. Consequently, photodiode CR1 is prevented from saturating.

Although the photosensor has been illustrated as a photodiode type, it is apparent to those skilled in the art that the photosensor may be any light responsive semiconductor, such as a phototransistor or a duo-diode, which has at least two electrodes and which requires a substantial amount of time to respond to a dark condition after being saturated. Although diodes CR1 and CR2 have been illustrated as having their cathodes connected together, it is apparent that their anodes may be connected together. For this connection reference potential V1 should be more positive than reference potential V2; and reference potential V3 should be more positive than potential V2 and less positive than potential V1. Also, for this connection transistor Q1 should be a PNP type in place of the illustrated NPN type.

What is claimed is:

1. A circuit comprising
a light responsive semiconductor having first and second electrodes,
means for coupling first and second reference potentials to said first and second electrodes, respectively, where said first reference potential is more positive than said second, and
means for clamping one of said first and second electrodes to a potential intermediate said first and second potentials when said semiconductor responds to a predetermined light intensity.

2. A circuit comprising
a light responsive semiconductor having first and second electrodes,
means for coupling first and second reference potentials to said first and second electrodes, respectively, where said first reference potential is more positive than said second, and
means coupled between a third reference potential and one of said first and second electrodes for preventing the saturation of said light responsive semiconductor.

3. A circuit comprising
a light responsive semiconductor having first and second electrodes,
means for coupling first and second reference potentials to said first and second electrodes, respectively, where said first reference potential is more positive than said second,
a diode having a cathode and an anode, and
means for coupling one of said anode and cathode to one of said first and second electrodes and the other of said anode and cathode to a third reference potential intermediate said first and second potentials.

4. A circuit comprising
a light responsive semiconductor having first and second electrodes,
means for coupling first and second reference potentials to said first and second electrodes, respectively, where said first reference potential is more positive than said second,
a diode having a cathode and an anode,
a transistor having a base, collector and emitter, means for coupling one of said anode and cathode, one of said first and second electrodes, and said transistor base together and the other of said anode and cathode to a third reference potential intermediate said first and second potentials, and
means for coupling said transistor collector and emitter, respectively, to fourth and fifth reference potentials.

5. A circuit comprising
a photodiode having an anode and a cathode,
means for coupling first and second reference potentials to said anode and cathode, respectively, where said first reference potential is less positive than said second, and
means for clamping one of said anode and cathode to a potential intermediate said first and second potentials when said photodiode responds to a predetermined light intensity.

6. A circuit comprising
a photodiode having an anode and a cathode,
means for coupling first and second reference potentials to said anode and cathode, respectively, where said first reference potential is less positive than said second,
a diode having a cathode and an anode, and
means for coupling one of the anode and cathode of said diode to one of the anode and cathode of said photodiode and the other of the anode and cathode of said diode to a third reference potential intermediate said first and second potentials.

7. A circuit comprising
a photodiode having an anode and a cathode,
means for coupling first and second reference potentials to said anode and cathode, respectively, where said first reference potential is less positive than said second,
a diode having a cathode and an anode,
a transistor having a base, collector and emitter,
means for coupling one of the anode and cathode of said photodiode, one of the anode and cathode of said diode, and said transistor base together and the other of the anode and cathode of said diode to a third reference potential intermediate said first and second potentials, and
means for coupling said transistor collector and emitter, respectively, to fourth and fifth reference potentials.

References Cited

UNITED STATES PATENTS

| | | | |
|---|---|---|---|
| 3,019,700 | 2/1962 | Colman | 250—260 X |
| 3,102,924 | 9/1963 | Legler | 250—206 X |
| 3,104,323 | 9/1963 | Over et al. | 307—88.5 |
| 3,189,745 | 6/1965 | Van Reymersdal | 250—214 |
| 3,214,705 | 10/1965 | Smith et al. | 250—207 X |
| 3,333,106 | 7/1967 | Fischer | 250—214 |

RALPH G. NILSON, *Primary Examiner.*

M. A. LEAVITT, *Assistant Examiner.*